United States Patent
Hanyu

(10) Patent No.: US 8,611,051 B1
(45) Date of Patent: Dec. 17, 2013

(54) MAGNETIC HEAD, HEAD GIMBAL ASSEMBLY WITH THE SAME, AND DISK DRIVE

(71) Applicant: Kabushiki Kaisha Toshiba, Tokyo (JP)

(72) Inventor: Mitsunobu Hanyu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/776,507

(22) Filed: Feb. 25, 2013

(51) Int. Cl.
*G11B 5/60* (2006.01)

(52) U.S. Cl.
USPC .................................................. 360/236.3

(58) Field of Classification Search
USPC ............. 360/234.3, 235.4, 235.5, 235.8, 236, 360/236.3, 236.6, 237
See application file for complete search history.

(56) References Cited

U.S. PATENT DOCUMENTS

| | | | | |
|---|---|---|---|---|
| 7,643,251 B1* | 1/2010 | Zhang et al. | ............... | 360/235.6 |
| 8,089,729 B2* | 1/2012 | Huang | ............... | 360/235.8 |
| 8,094,411 B2* | 1/2012 | Huang et al. | ............... | 360/235.8 |
| 8,174,795 B2* | 5/2012 | Song et al. | ............... | 360/235.5 |
| 8,427,784 B2* | 4/2013 | Sonoda | ............... | 360/235.7 |
| 2009/0109572 A1* | 4/2009 | Watanabe | ............... | 360/235.4 |
| 2009/0231759 A1 | 9/2009 | Kameyama | | |
| 2011/0032641 A1* | 2/2011 | Ookubo et al. | ............ | 360/235.5 |
| 2011/0090597 A1* | 4/2011 | Hanyu | ............... | 360/235.5 |
| 2011/0141622 A1* | 6/2011 | Takeuchi | ............... | 360/235.4 |

FOREIGN PATENT DOCUMENTS

| | | |
|---|---|---|
| JP | 2642589 | 5/1997 |
| JP | 2009-110618 | 5/2009 |
| JP | 2009-223954 | 10/2009 |

* cited by examiner

*Primary Examiner* — Angel Castro
(74) *Attorney, Agent, or Firm* — Patterson & Sheridan, LLP

(57) ABSTRACT

According to one embodiment, a bearing surface of the head slider includes a leading step at the inflow end portion, a skirt portion at the inflow end portion, a leading pad on the leading step and including a junction extending to the skirt portion, first groove surfaces individually on the opposite sides of the junction and being continuous with a downstream central portion of the skirt portion, second groove surfaces on an upstream side of the first groove surfaces and formed deeper than the first groove surfaces, and negative-pressure grooves individually on the transversely opposite sides of the first groove surfaces between the second groove surfaces and the skirt portion and formed deeper than the second groove surfaces.

14 Claims, 6 Drawing Sheets

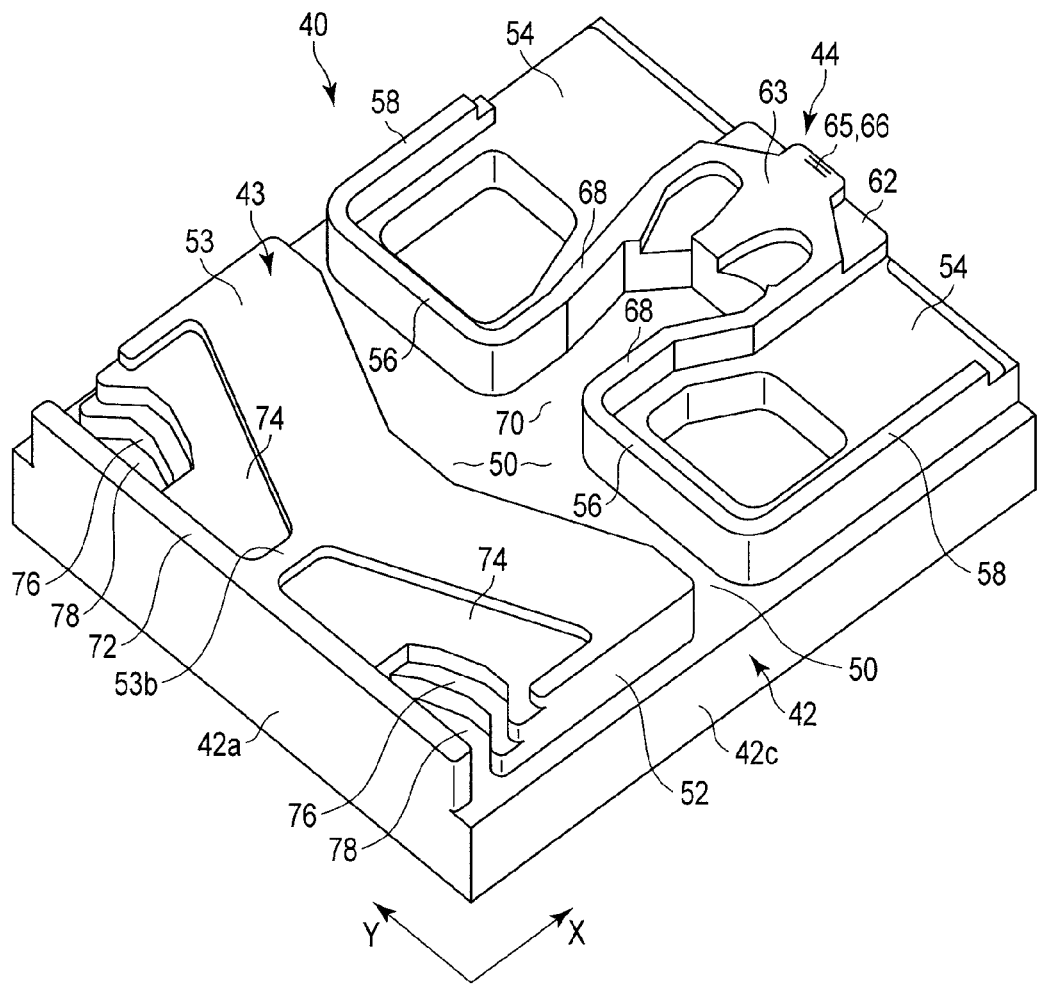
F I G. 3

Results of analysis on model without second groove surfaces

MAGNETIC HEAD, HEAD GIMBAL ASSEMBLY WITH THE SAME, AND DISK DRIVE

CROSS-REFERENCE TO RELATED APPLICATIONS

This application is based upon and claims the benefit of priority from Japanese Patent Application No. 2012-165003, filed Jul. 25, 2012, the entire contents of which are incorporated herein by reference.

FIELD

Embodiments described herein relate generally to a magnetic head used in a disk drive, such as a magnetic disk drive, a head gimbal assembly provided with the head, and the disk drive.

BACKGROUND

A disk drive, such as a magnetic disk drive, comprises a magnetic disk for use as a recording medium, a spindle motor, a magnetic head, and a carriage assembly. The magnetic disk is disposed in a case. The spindle motor supports and rotates the magnetic disk. The magnetic head reads data from and writes data to the magnetic disk. The carriage assembly supports the head for movement relative to the magnetic disk. The magnetic head comprises a slider mounted on a suspension of the carriage assembly and a head section on the slider. The head section comprises a recording element for writing and a reproduction element for reading.

The head slider comprises a bearing surface (air-bearing surface or ABS) opposed to a recording surface of the magnetic disk. The head slider is subjected to a predetermined head load produced by the suspension and directed to a magnetic recording layer of the magnetic disk. When the magnetic disk drive is operating, an airflow is produced between the rotating disk and head slider, and the ABS of the slider is subjected to a force (positive pressure) that causes the slider to fly relative to the recording surface of the disk, based on the principle of air lubrication. The head slider is caused to fly over the recording surface of the magnetic disk, with a gap therebetween, by balancing this flying force with the head load.

In recent years, to meet the demand for greater recording density, increasing importance has been attached to reduction of head flying height and flying-height control in a low-height area, and development of technologies for dynamically controlling the head flying height has advanced rapidly. Presently, the flying gap between a magnetic disk and the head slider of a magnetic head in the vicinity of a read/write element is 10 nm or less. Further, for read/write operations, the gap between the read/write element and the magnetic disk is reduced to approximately several nanometers by additionally using a dynamic flying height (DFH) technology in which the magnetic spacing is controlled by dynamically adjusting the projection of the read/write element.

As a result, certain problems have become apparent. For example, a lubricant applied to the disk surface is transferred to the ABS of the head slider flying above the magnetic disk, the magnetic spacing is increased, and the flying performance of the head slider is made unstable.

The lubricant transferred to the ABS of the head slider of the magnetic head is moved onto the air-outflow end surface of the head slider by the airflow and accumulates there. If the transferred lubricant accumulates excessively, the flying height of the head slider becomes unstable. Thereupon, a high-fly write (HFW) problem occurs in which the recording and reproduction signals become unstable. Further, there is a problem wherein the reproduction signals vary when the magnetic disk drive is started up, since the lubricant diffuses and returns to the read/write element portion on the ABS side while the magnetic head is in an unloaded state with the disk drive off.

BRIEF DESCRIPTION OF THE DRAWING

FIG. 3 is a perspective view showing the ABS side of a head slider of the magnetic head;

DETAILED DESCRIPTION

Various embodiments will be described hereinafter with reference to the accompanying drawings. In general, according to one embodiment, a magnetic head comprises: a head slider comprising a bearing surface opposed to a surface of a recording medium, and an inflow end portion and an outflow end portion for an airflow produced between the recording medium surface and the bearing surface; and a recording element and a reproduction element in the outflow end portion of the head slider. The bearing surface comprises a leading step at the inflow end portion, a skirt portion located at the inflow end portion and extending transversely relative to the head slider, a leading pad on the leading step and comprising a junction extending, at a transversely central portion thereof, to the skirt portion, first groove surfaces disposed individually on the opposite sides of the junction and being continuous with a downstream central portion of the skirt portion, second groove surfaces disposed on an upstream side of the first groove surfaces and formed deeper than the first groove surfaces, and negative-pressure grooves disposed individually on the transversely opposite sides of the first groove surfaces between the second groove surfaces and the skirt portion and formed deeper than the second groove surfaces.

An embodiment in which a disk drive is applied to a hard disk drive (HDD) will now be described in detail with reference to the accompanying drawings.

Figure 1:
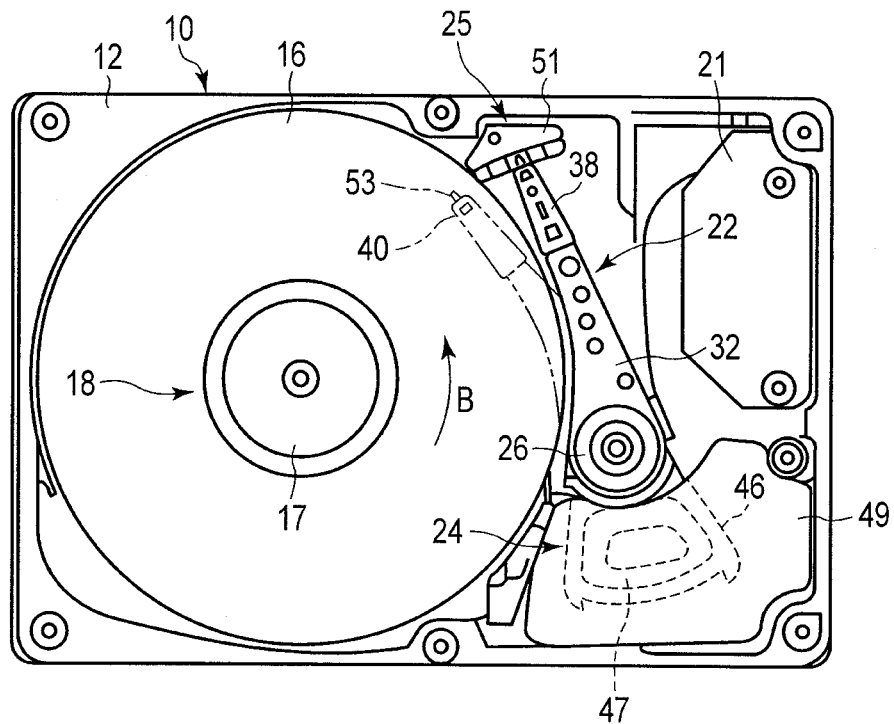
FIG. 1 is a plan view showing an HDD according to an embodiment.
Figure 2:
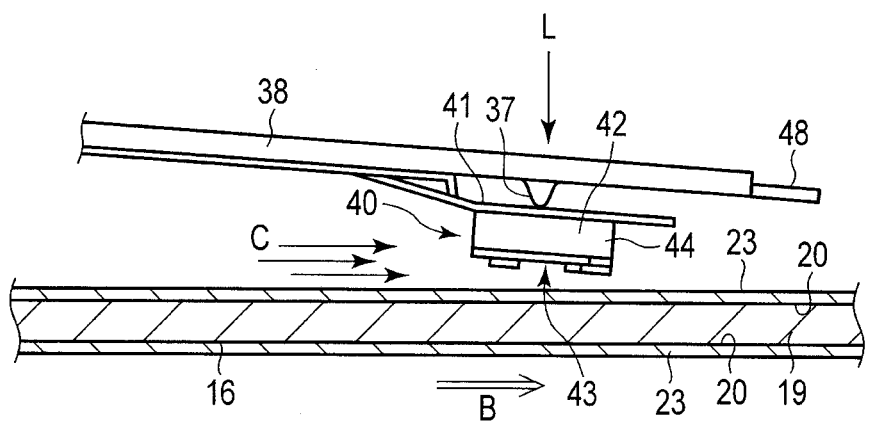
FIG. 2 is an enlarged side view showing a magnetic head section of the HDD.

FIG. 1 shows the internal structure of the HDD with the top cover of its housing removed, and FIG. 2 shows a flying magnetic head. As shown in FIG. 1, the HDD comprises a housing 10. The housing 10 comprises a case 12 in the form of an open-topped rectangular box and a top cover (not shown), which is attached to the case by screws so as to close the top opening of the case.

The case 12 of the housing 10 carries therein a magnetic disk 16 for use as a recording medium, and a mechanical unit.

The mechanical unit comprises a spindle motor 18, a plurality (for example, two) of magnetic heads 40, a carriage assembly 22, and a voice coil motor (VCM) 24. The spindle motor 18 supports and rotates the magnetic disk 16. The magnetic heads 40 record and reproduce data on and from the magnetic disk. The carriage assembly 22 supports the heads 40 for movement relative to the disk 16. The VCM 24 pivots and positions the carriage assembly 22. Further, a ramp loading mechanism 25, a board unit 21, etc., are arranged in the case 12. The ramp loading mechanism 25 holds the magnetic heads 40 in a position off the magnetic disk when the heads are moved to the outermost periphery of the magnetic disk. Electronic components, such as a preamplifier, a head IC, etc., are mounted on the board unit 21.

A control circuit board (not shown) is attached to the outer surface of the bottom of the case 12 by screws. This circuit board controls the operations of the spindle motor 18, VCM 24, and magnetic heads 40 through the board unit 21.

As shown in FIGS. 1 and 2, the magnetic disk 16 comprises a substrate 19 formed of a nonmagnetic disk with a diameter of, for example, about 2.5 inches (63.5 mm). A magnetic recording layer 20 is laminated on each surface of the substrate 19, a protective film (not shown) is formed on the recording layer 20, and in addition, a lubricant (for example, oil or an organic liquid) 23 is applied to a thickness of about 1 nm on the uppermost layer.

The magnetic disk 16 is fitted on a hub (not shown) of the spindle motor 18 and secured to the hub by a clamp spring 17. Thus, the magnetic disk 16 is supported parallel to the bottom of the case 12. The magnetic disk 16 is rotated in the direction of arrow B at a predetermined speed, for example, 5,400 or 7,200 rpm, by the spindle motor 18.

The carriage assembly 22 comprises a bearing unit 26 secured to the bottom of the case 12 and a plurality of arms 32 extending from the bearing unit. These arms 32 are located parallel to the surfaces of the magnetic disk 16 with predetermined spaces therebetween and extend in the same direction from the bearing unit 26. The carriage assembly 22 comprises elastically deformable suspensions 38 each in the form of an elongated plate. Each suspension 38 is formed of a plate spring, the proximal end of which is secured to the distal end of its corresponding arm 32 by spot welding or adhesive bonding and extends from the arm. Each suspension 38 may be integrally formed with its corresponding arm 32.

As shown in FIG. 2, each magnetic head 40 comprises a substantially cuboid head slider 42 and read/write head section 44 on the slider and is secured to a gimbal 41 on the distal end portion of the suspension 38. Each suspension 38 is formed with a dimple or substantially hemispheric protrusion 37 projecting on the magnetic head side in this case. The protrusion 37 is located at that position on the suspension 38 which faces the head mounting portion of the gimbal 41, that is, the central portion of the magnetic head 40. The protrusion 37 abuts a substantially central portion of a flat surface of the head slider 42 with the gimbal 41 between them. The gimbal 41 is pressed against the protrusion 37 by its own elasticity. Thus, the magnetic head 40 and the head mounting portion of the gimbal 41 can be displaced in the pitch and roll directions or vertically around the protrusion 37. Further, the magnetic head 40 is subjected to a predetermined head load L produced by the spring force of the suspension 38 and directed to the surface of the magnetic disk 16.

The suspension 38, gimbal 41, magnetic head 40, and arm 32 constitute a head gimbal assembly. The head gimbal assembly need not always comprise the arm 32.

As shown in FIG. 1, the carriage assembly 22 comprises a supporting frame 46 extending from the bearing unit 26 on the opposite side to the arms 32. This supporting frame supports a voice coil 47 that constitutes part of the VCM 24. The supporting frame 46 is a plastic structure integrally formed on the voice coil 47. The voice coil 47 is located between a pair of yokes secured to the case 12. Thus, the voice coil, along with the yokes and a magnet (not shown) secured to one of the yokes, constitutes the VCM 24. If the voice coil 47 is energized, the carriage assembly 22 pivots around the bearing unit 26, whereupon each magnetic head 40 is moved to and positioned over a desired track on the magnetic disk 16.

The ramp loading mechanism 25 comprises a ramp 51 and tabs 48. The ramp 51 is disposed on the bottom of the case 12 and located outside the magnetic disk 16. The tabs 48 extend individually from the respective distal ends of the suspensions 38. As the carriage assembly 22 pivots to a retracted position outside the disk 16, each of the tabs 48 engages with a ramp surface formed on the ramp 51 and is then pushed up the ramp surface, whereupon the magnetic heads 40 are unloaded.

The structure of one of the magnetic heads 40 will now be described in detail. FIG. 3 is a perspective view showing the head slider 42 of the magnetic head, and FIG. 4 is a plan view of the head slider.

Figure 4:
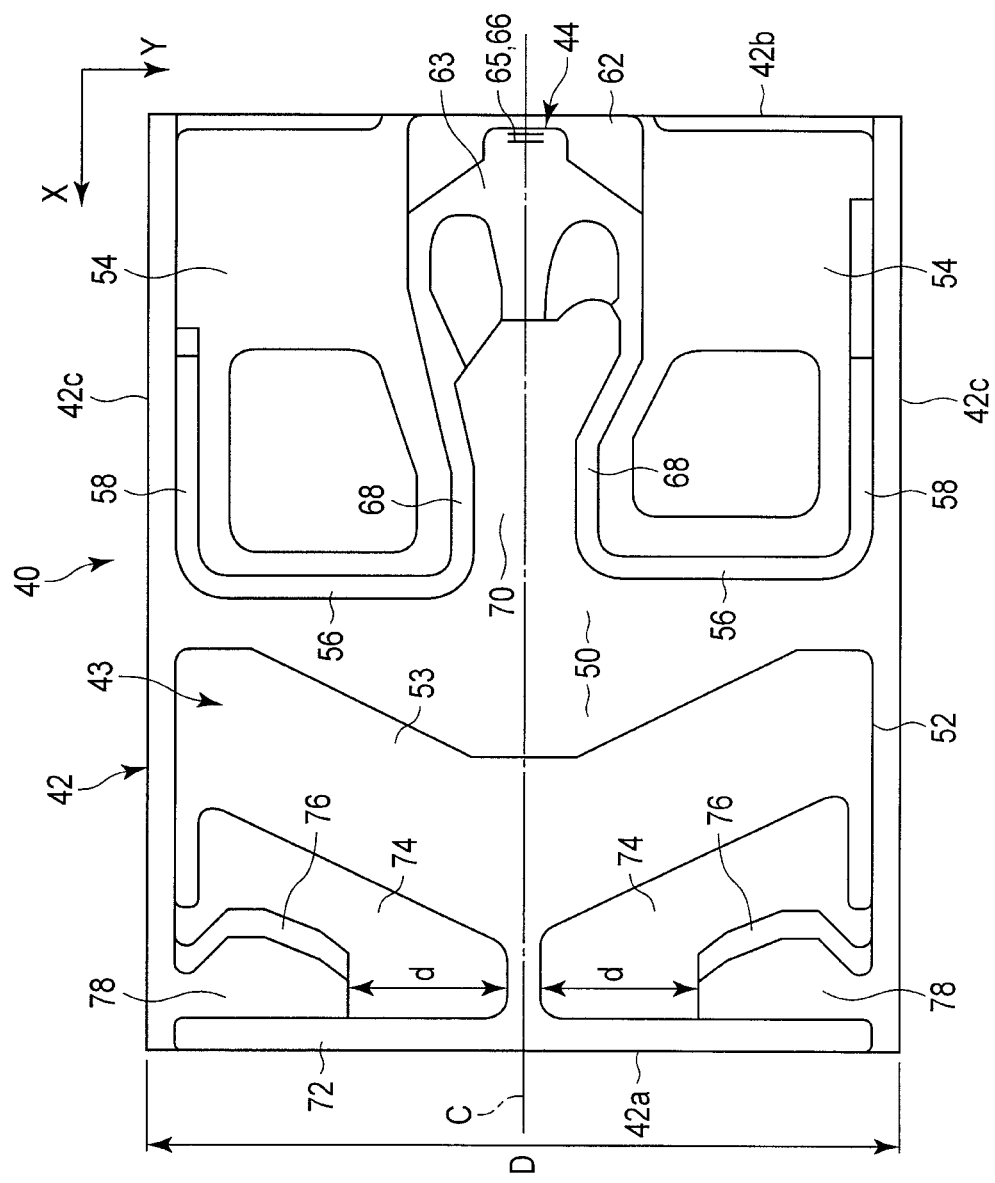
FIG. 4 is a plan view showing the ABS side of the head slider.

As shown in FIGS. 3 and 4, each magnetic head 40 is constructed as a flying head, which comprises the head slider 42 and read/write head section 44. The head slider 42 is formed of, for example, a sintered body containing alumina and titanium carbide (AlTic or $Al_2O_3$—TiC). The slider 42 has a substantially cuboid structure as a whole, and comprises a rectangular air-bearing surface (ABS) 43, inflow end surface 42a, outflow end surface 42b, and a pair of side surfaces 42c. The ABS 43 is opposed to a surface of the magnetic disk 16. The inflow and outflow end surfaces 42a and 42b extend perpendicular to the ABS. The side surfaces 42c extend perpendicular to the ABS between the end surfaces 42a and 42b. The head section 44 is formed of thin films arranged on the outflow end of the slider body 45.

The longitudinal direction of the ABS 43 is assumed to be a first direction X, and the transverse direction perpendicular thereto to be a second direction Y. The head slider 42 is a so-called femtoslider having a length L of 1.25 mm or less, for example, 0.85 mm, in the first direction X and a width W of 1.0 mm or less, for example, 0.7 mm, in the second direction Y.

The head slider 42 is caused to fly by the airflow C (FIG. 2) produced between the disk surface and the ABS 43 as the magnetic disk 16 rotates. When the HDD is operating, the ABS 43 of the slider 42 is opposed to the disk surface with a gap therebetween. The direction of airflow C is coincident with the direction of rotation B of the disk 16. The slider 42 is located on the surface of the disk 16 in such a manner that the first direction X of the ABS 43 is substantially coincident with the direction of airflow C.

As shown in FIGS. 3 and 4, a band-shaped negative-pressure groove (first negative-pressure groove) 50 extending throughout the length in the second direction Y is formed substantially in the central portion of the ABS 43. If the head slider 42 is, for example, 0.23 mm thick, the depth of the groove 50 is 800 to 1,500 nm, for example, 1,500 nm. The negative-pressure groove 50 serves to produce a negative pressure on the central portion of the ABS 43 at every feasible yaw angle for the HDD.

An elongated skirt portion 72 is formed at the inflow end of the ABS 43 and extends substantially throughout the length of the head slider 42 in the second direction Y. A substantially rectangular leading step 52 is formed on the downstream side of the skirt portion 72 and extends substantially throughout the length of the head slider 42 in the second direction Y. The skirt portion 72 and leading step 52 project from the bottom surface of the negative-pressure groove 50 and are located on the inflow side of the groove 50 with respect to the airflow C.

In order to maintain the pitch angle of the magnetic head 40, a leading pad 53 that supports the head slider 42 by means of an air film is formed projecting from the leading step 52. The leading pad 53 and skirt portion 72 are formed flush with each other. The leading pad 53 is formed in an M-shape, which opens in a plurality of positions toward the inflow side. The leading pad 53 comprises a junction 53b that extends along the central axis C at its transversely central portion to the central portion of the skirt portion 72, that is, connects with the central portion of the skirt portion.

At the inflow end portion of the head slider 42, first groove surfaces 74 are formed on the transversely opposite sides of the junction 53b and on the upstream side of the leading pad 53. The first groove surfaces 74 are continuous with the downstream central portion of the skirt portion 72. Second groove surfaces 76 deeper than the first groove surfaces 74 are formed on the upstream side of the first groove surfaces. Further, negative-pressure grooves (second negative-pressure grooves) 78 are disposed on the transversely opposite sides of the first groove surfaces 74 between the second groove surfaces 76 and skirt portion 72. The negative-pressure grooves 78 are deeper than the second groove surfaces 76 and, for example, as deep as the negative-pressure groove (first negative-pressure groove) 50.

If the overall width of the head slider 42 and the width of each of the first groove surfaces (connection steps) 74 on the transversely opposite sides of the junction 53b, in the second direction Y, are D and d, respectively, as shown in FIG. 4, d is about 30% of D.

Figure 5:
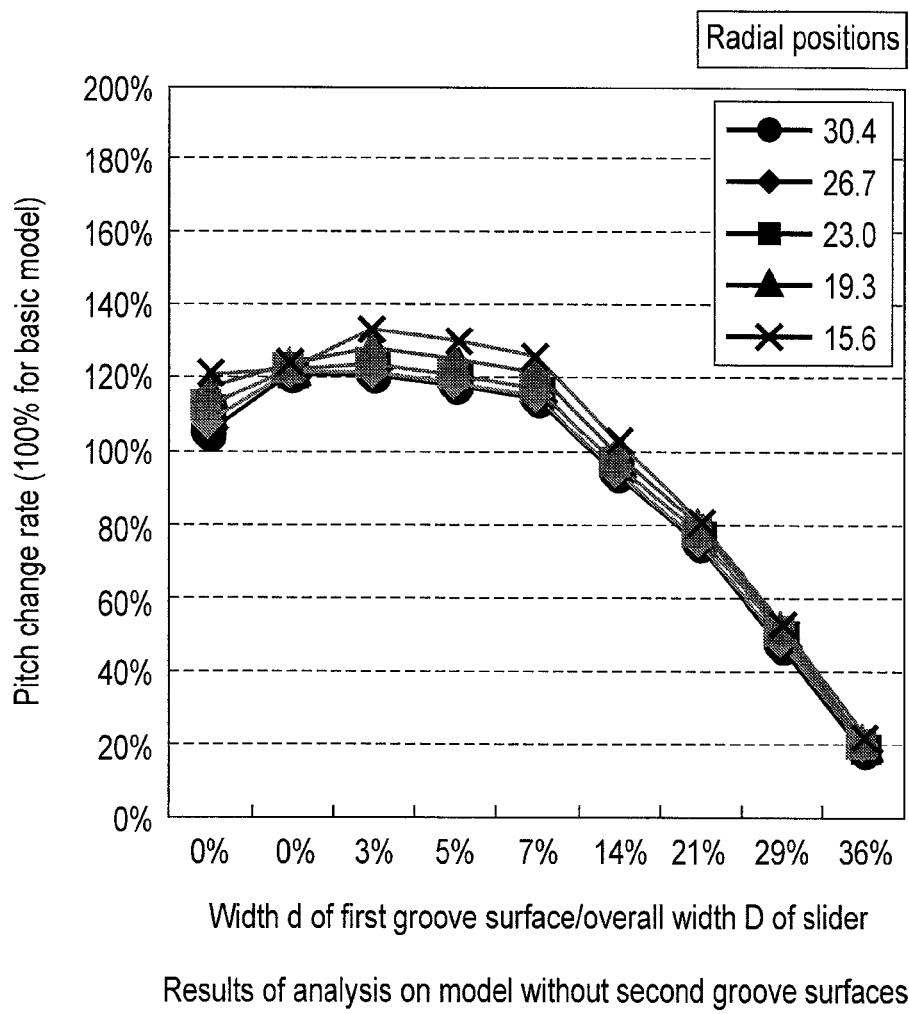
FIG. 5 is a diagram showing the relationship between the rate of change of the flying pitch of a head slider without second groove surfaces and the ratio of the width d of each first groove surface to the overall width D of the slider.
Figure 6:
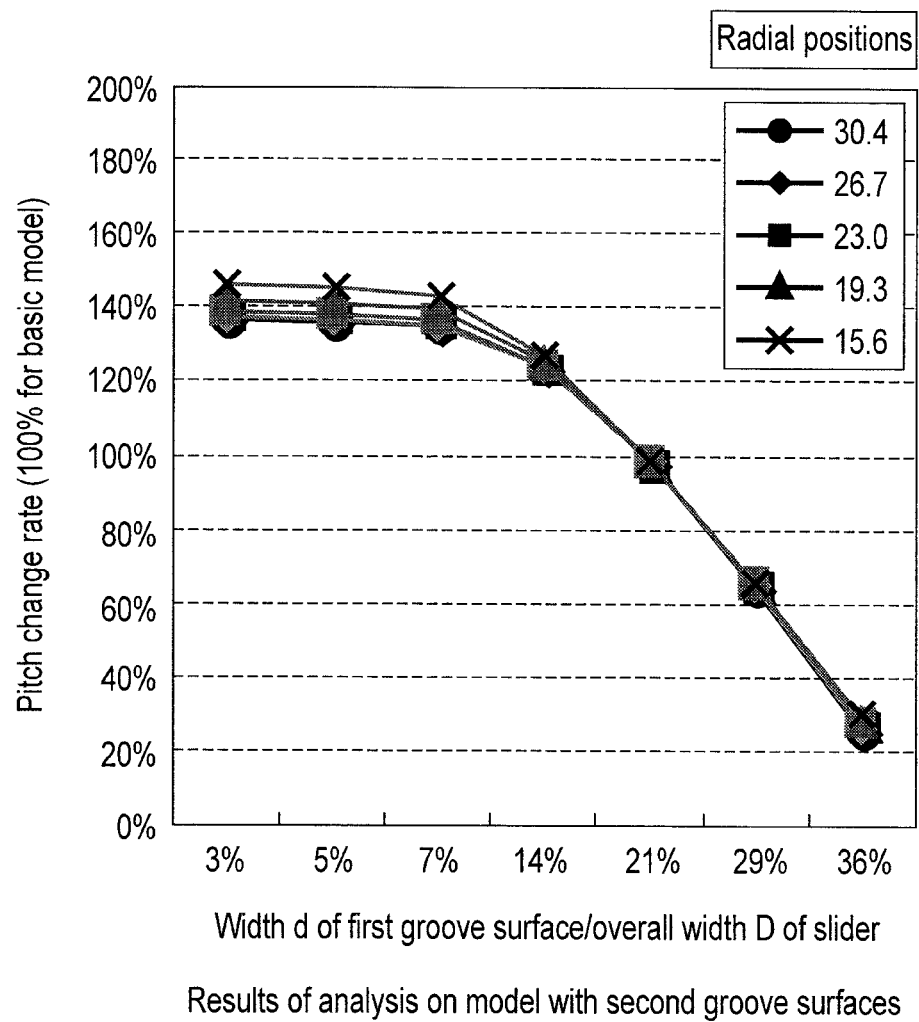
FIG. 6 is a diagram showing the relationship between the rate of change of the flying pitch of a head slider comprising first and second groove surfaces and the ratio of the width d of each first groove surface to the overall width D of the slider.
Figure 7:
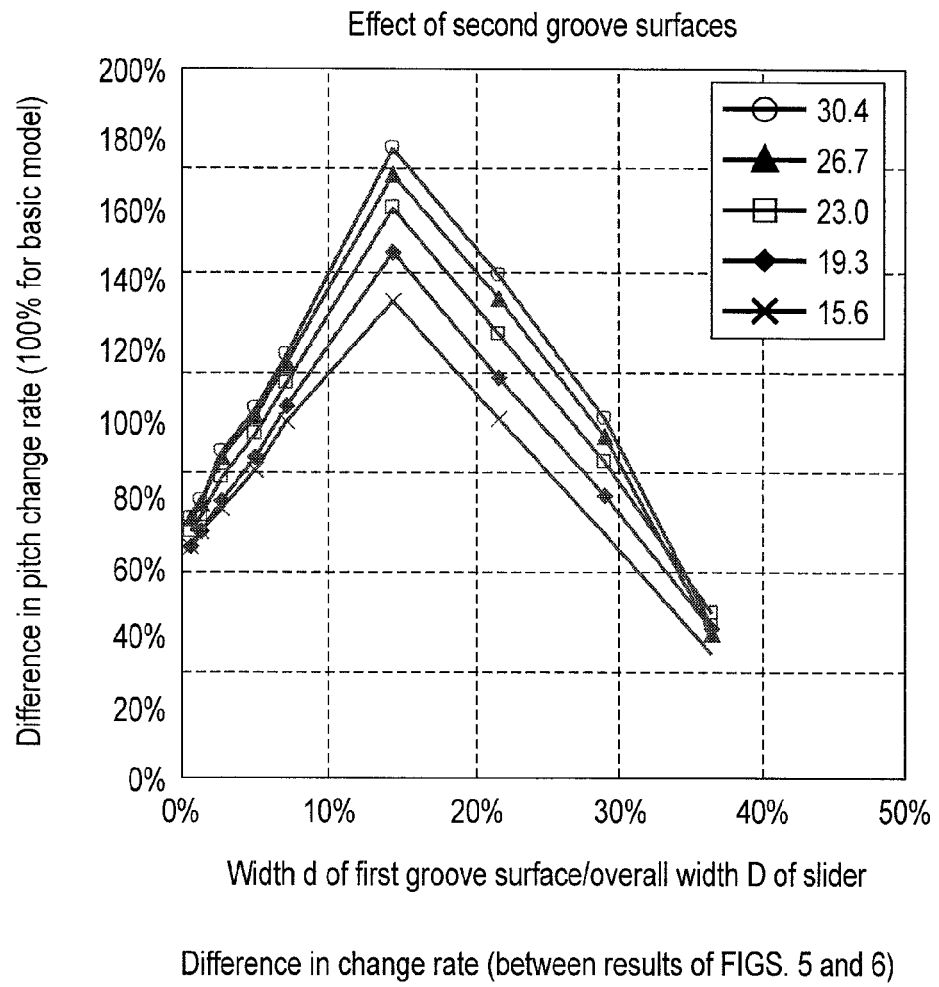
FIG. 7 is a diagram showing differences between the rates of flying pitch change shown in FIGS. 5 and 6.

An optimal value is given for the width d of each first groove surface 74 to be formed. The optimal value stated herein indicates the "maximum width within a range in which the flying pitch attitude of the head slider can be maintained". The width d of each first groove surface 74 should be as large as possible in order to prevent cohesion of the organic liquid. It is believed, however, that if width d is too large, the rate of airflow becomes insufficient as the low-clearance area increases. Therefore, a positive pressure on the leading end side of the head slider is reduced, so that it is difficult to maintain the flying pitch attitude of the slider. The first groove surfaces (connection steps) 74 and second groove surfaces (intermediate steps) 76 are provided according to the present embodiment. As shown in FIGS. 5 to 7, moreover, the width d of each first groove surface 74 is restricted to about 5 to 30% of the overall width D of the head slider 42. Even if width d is increased, therefore, a necessary positive pressure can be produced to suppress degradation in the flying pitch attitude.

FIG. 5 shows the results of an analysis of a head slider without the second groove surfaces (intermediate steps) 76. In FIG. 5, the abscissa and ordinate represent the ratio of the width d of each first groove surface to the overall width D of the head slider and the rate of change of the flying pitch relative to a basic model, respectively. The basic model stated herein is a magnetic head designed so that the overall width D of its head slider and the width d of each first groove surface are 700 and 150 µm, respectively. The flying pitch of this basic model is assumed to be 100%. Further, the rate of pitch change is analyzed for five radial positions on the magnetic disk. The results are shown comparatively.

FIG. 6 shows the results of an analysis of a head slider comprising the first groove surfaces 74 and second groove surfaces (intermediate steps) 76. In FIG. 6, the abscissa and ordinate represent the ratio of the width d of each first groove surface to the overall width D of the head slider and the rate of change of the flying pitch relative to a basic model, respectively. The flying pitch of this basic model, which is similar to the foregoing one, is assumed to be 100%.

FIG. 7 shows differences in the rate of flying pitch change obtained by subtracting the rate of flying pitch change shown in FIG. 5 from that shown in FIG. 6, that is, differences in the rate of flying pitch change between the cases of head sliders with and without the second groove surfaces 76.

Even if the width d of each first groove surface 74 is increased, a necessary positive pressure can be produced to suppress degradation in the flying pitch attitude by restricting width d to about 5 to 30% of the overall width D of the head slider 42, as shown in FIGS. 5 to 7. It is indicated, moreover, that the second groove surfaces 76 serve to reduce the rate of pitch change, thereby maintaining a more reliable flying pitch attitude.

As shown in FIGS. 3 and 4, on the other hand, a negative-pressure cavity 54, a recess, is formed ranging from a substantially central portion of the ABS 43 to the outflow end side. The negative-pressure cavity 54 is located on the outflow end side of the negative-pressure groove 50 and opens toward an outflow end surface 42b of the head slider 42. The negative-pressure cavity 54 is shallower than the negative-pressure groove 50, that is, it is formed in a position higher than the bottom surface of the groove 50.

A rib-shaped intermediate step 56 and a pair of side steps 58 are formed on the ABS 43 such that they surround the negative-pressure cavity 54. The intermediate step 56 is located between the negative-pressure groove 50 and negative-pressure cavity 54 and extends in the second direction Y between the opposite side edges of the ABS 43. The intermediate step 56 projects from the bottom surface of the negative-pressure cavity 54 and is located on the inflow side of the cavity 54 with respect to the airflow C.

The pair of side steps 58 are formed individually along the side edges of the ABS 43 and extend from the intermediate step 56 toward the outflow end of the ABS 43. These side steps 58 project from the bottom surface of the negative-pressure cavity 54.

The intermediate step 56 and side steps 58 are substantially U-shaped as a whole, closed upstream and open downstream. The steps 56 and 58 define the negative-pressure cavity 54.

As shown in FIGS. 3 and 4, the head slider 42 comprises a trailing step 62 formed on the outflow end portion of the ABS 43 with respect to the airflow C. The trailing step 62 projects from the bottom surface of the negative-pressure cavity 54 so that it is flush with the leading step 52. The trailing step 62 is located substantially in the center of the ABS 43 with respect to the second direction Y. A trailing pad 63 that supports the head slider 42 by means of an air film is formed projecting from the upper surface of the trailing step 62.

The trailing pad 63 is kept at an inflow-side gap away from the outflow end surface of the trailing step 62 or the outflow end surface 42b of the head slider 42 in this case. The trailing pad 63 is formed flush with the leading pad 53, intermediate step 56, and side steps 58, which define the uppermost surface of the head slider 42 that constitutes the ABS 43. The trailing step 62 and trailing pad 63 constitute a second pressure generating unit.

The head section 44 of the magnetic head 40 comprises a recording element 65 and reproduction element 66 for recording data on and reproducing data from the magnetic disk 16. These elements 65 and 66 are embedded in the downstream end portion of the head slider 42 with respect to the direction of airflow C or in the trailing step 62 in this case. The respective distal end portions of the elements 65 and 66 are exposed in the ABS 43 in a position corresponding to the trailing pad 63.

The ABS 43 of the head slider 42 comprises a pair of elongated center rails 68 extending in the first direction X from the intermediate step 56 to the trailing step 62. The center rails 68 are located individually on the opposite sides of the central axis C of the head slider 42 and face each other across a gap in the second direction Y. The center rails 68 are formed so that its height above the bottom surface of the negative-pressure cavity 54 is the same as those of the intermediate step 56 and trailing pad 63. A guide groove 70 that guides the airflow to the trailing step 62 and trailing pad 63 is formed between the pair of center rails 68. The guide groove 70 is formed along the central axis C and extends through the negative-pressure groove 50 to the leading step 52.

In the present embodiment, the ABS 43, including the surface of the trailing pad 63 in which the respective distal ends of the recording and reproduction elements 65 and 66 are exposed, is formed so that its arithmetic surface roughness is greater than the surface roughness of other portions of the head slider 42, for example, the upper surface of the trailing step 62 and the bottom surface of the negative-pressure cavity 54 in this case.

According to the HDD constructed in this manner, each magnetic head 40 is caused to fly by the airflow C produced between the disk surface and the ABS 43 as the magnetic disk 16 rotates. When the HDD is operating, therefore, the ABS 43 of the slider 42 is always opposed to the disk surface with a gap therebetween. The magnetic head 40 flies with the recording and reproduction elements 65 and 66 of the head section 44 inclined to be closest to the surface of the disk 16.

In general, a strong airflow is produced above the ABS 43 of the head slider 42 while the magnetic head 40 is running above the magnetic disk 16, so that any adhering organic liquid (magnetic disk lubricant or the like) flows and does not easily accumulate. However, the airflow above the bottom surface of each negative-pressure groove 78 formed between the skirt portion 72 and leading step 52 at the inflow end portion of the head slider 42 is relatively weak, so that the liquid easily accumulates there. The accumulated liquid on the bottom surface of the negative-pressure groove 78 diffuses and forms a film on the ABS 43 when the magnetic head 40 is unloaded and retracted from above the magnetic disk 16. Thereupon, the flying height of the head 40 increases by a margin equivalent to the thickness of the formed film at the time of loading (drive startup), so that the read/write properties are degraded. According to the present embodiment described above, therefore, the first and second groove surfaces 74 and 76 are disposed between the leading pad 53 and skirt portion 72, so that the organic liquid can be prevented from cohering in the negative-pressure grooves 78. Further, the width d of each first groove surface 74 adjacent to the central portion of the skirt portion 72 is restricted to about 5 to 30% of the overall width D of the head slider 42. Even if width d is increased, therefore, a necessary positive pressure can be produced to suppress degradation in the flying pitch attitude of the slider 42.

According to the present embodiment, as described above, there can be obtained a magnetic head, head gimbal assembly, and magnetic disk drive with improved reliability, in which the flying height cannot be easily changed if a liquid, such as a lubricant, adheres to the head and which can perform stable recording and reproduction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, this invention is not limited to femtosliders and may also be applied to picosliders, pemtosliders, or other larger sliders. The shapes, sizes, etc., of the trailing step, trailing pad, and other parts of the head slider may be changed if necessary. The number of magnetic disks used in the disk drive is not limited to one and may be increased as required.

What is claimed is:

1. A magnetic head comprising:
   a head slider comprising a bearing surface opposed to a surface of a recording medium, and an inflow end portion and an outflow end portion for an airflow produced between the recording medium surface and the bearing surface; and
   a recording element and a reproduction element in the outflow end portion of the head slider,
   the bearing surface comprising a leading step at the inflow end portion, a skirt portion located at the inflow end portion and extending transversely relative to the head slider, a leading pad on the leading step and comprising a junction extending, at a transversely central portion thereof, to the skirt portion, first groove surfaces disposed individually on the opposite sides of the junction and being continuous with a downstream central portion of the skirt portion, second groove surfaces disposed on an upstream side of the first groove surfaces and formed deeper than the first groove surfaces, and negative-pressure grooves disposed individually on the transversely opposite sides of the first groove surfaces between the second groove surfaces and the skirt portion and formed deeper than the second groove surfaces.

2. The magnetic head of claim 1, wherein the width of each of the first groove surfaces transversely relative to the head slider ranges from 5 to 30% of an overall width of the head slider on each side of the junction.

3. The magnetic head of claim 2, wherein the bearing surface comprises a negative-pressure cavity on the downstream side of the leading step and extending transversely relative to the bearing surface.

4. The magnetic head of claim 3, wherein the bearing surface comprises a trailing step at the outflow end portion, and a trailing pad on the trailing step, comprising an outflow end located at an inflow-side gap away from an end surface of the outflow end portion.

5. The magnetic head of claim 4, wherein the recording and reproduction elements are partially exposed in the trailing pad.

6. The magnetic head of claim 1, wherein the bearing surface comprises a negative-pressure cavity on the downstream side of the leading step and extending transversely relative to the bearing surface.

7. The magnetic head of claim 1, wherein the bearing surface comprises a trailing step at the outflow end portion, and a trailing pad on the trailing step, comprising an outflow end located at an inflow-side gap away from an end surface of the outflow end portion.

8. The magnetic head of claim 2, wherein the bearing surface comprises a trailing step at the outflow end portion, and a trailing pad on the trailing step, comprising an outflow end located at an inflow-side gap away from an end surface of the outflow end portion.

9. A head gimbal assembly comprising:
   the magnetic head of claim 1; and
   a suspension which supports the magnetic head by means of a gimbal.

10. The head gimbal assembly of claim 9, wherein the width of each of the first groove surfaces transversely relative to the head slider ranges from 5 to 30% of an overall width of the head slider on each side of the junction.

11. The head gimbal assembly of claim 10, wherein the bearing surface comprises a negative-pressure cavity on the downstream side of the leading step and extending transversely relative to the bearing surface.

12. A disk drive comprising:
    a disk recording medium;
    a drive unit which rotates the recording medium; and
    the magnetic head of claim 1 configured to perform data transfer with respect to the recording medium.

13. The disk drive of claim 12, wherein the width of each of the first groove surfaces transversely relative to the head slider ranges from 5 to 30% of an overall width of the head slider on each side of the junction.

14. The disk drive of claim 13, wherein the bearing surface comprises a negative-pressure cavity on the downstream side of the leading step and extending transversely relative to the bearing surface.

* * * * *